United States Patent
Enssle et al.

(10) Patent No.: US 10,782,822 B2
(45) Date of Patent: Sep. 22, 2020

(54) AUGMENTED TOUCH-SENSITIVE DISPLAY SYSTEM

(71) Applicant: Walmart Apollo, LLC, Bentonville, AR (US)

(72) Inventors: Benjamin D. Enssle, Bella Vista, AR (US); David Blair Brightwell, Bentonville, AR (US); Cristy Crane Brooks, Cassville, MO (US); Greg A. Bryan, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 44 days.

(21) Appl. No.: 16/000,409

(22) Filed: Jun. 5, 2018

(65) Prior Publication Data

US 2018/0356933 A1 Dec. 13, 2018

Related U.S. Application Data

(60) Provisional application No. 62/516,766, filed on Jun. 8, 2017.

(51) Int. Cl.
G06F 3/0484 (2013.01)
G06Q 10/08 (2012.01)
(Continued)

(52) U.S. Cl.
CPC .......... G06F 3/0416 (2013.01); G06F 1/1605 (2013.01); G06F 1/1643 (2013.01);
(Continued)

(58) Field of Classification Search
None
See application file for complete search history.

(56) References Cited

U.S. PATENT DOCUMENTS

| 7,240,027 B2 | 7/2007 | McConnell et al. |
| 7,693,757 B2 | 4/2010 | Zimmerman |

(Continued)

FOREIGN PATENT DOCUMENTS

| WO | 2016051182 A1 | 4/2016 | |
| WO | WO-2016051182 A1 * | 4/2016 | ............. G06Q 30/02 |
| WO | 2016109251 A1 | 7/2016 | |

OTHER PUBLICATIONS

International Search Report and Written Opinion from related International Patent Application No. PCT/US2018/035986 dated Oct. 3, 2018.

(Continued)

*Primary Examiner* — Parul H Gupta
(74) *Attorney, Agent, or Firm* — McCarter & English, LLP

(57) ABSTRACT

Described in detail herein are systems and methods for an augmented touch-sensitive display system. A portable electronic device can render on the touch-sensitive display a physical scene within the field of view of the image capturing device. The portable electronic device, can parse the physical scene rendered on the touch-sensitive display into discrete elements based on dimensions of items in the physical scene. The portable electronic device can superimpose a selectable link on the at least one of the discrete elements on the touch-sensitive display. In response to a first user gesture on the touch-sensitive display, corresponding with selection of the selectable link, augmenting, via portable electronic device, the physical scene rendered on the touch-sensitive display to superimpose physical object information associated with string of alphanumeric characters corresponding to the selectable link and one or more additional dynamically generated selectable links on the physical scene rendered on the display.

19 Claims, 8 Drawing Sheets

(51) Int. Cl.
  *G06F 3/041* (2006.01)
  *G06F 1/16* (2006.01)
  *G06Q 30/06* (2012.01)
  *G06K 9/00* (2006.01)
  *G06K 9/32* (2006.01)
  *G06F 3/01* (2006.01)
(52) U.S. Cl.
  CPC .......... *G06F 3/011* (2013.01); *G06F 3/04842* (2013.01); *G06K 9/00671* (2013.01); *G06K 9/325* (2013.01); *G06Q 10/087* (2013.01); *G06Q 10/0875* (2013.01); *G06Q 30/0643* (2013.01); *G06K 2209/01* (2013.01)

(56) References Cited

U.S. PATENT DOCUMENTS

| | | | |
|---|---|---|---|
| 8,224,720 B2 | 7/2012 | Cohen | |
| 8,321,303 B1 | 11/2012 | Krishnamurthy et al. | |
| 8,594,834 B1* | 11/2013 | Clark | G06Q 10/087 700/214 |
| 10,535,198 B2* | 1/2020 | Enssle | G06F 3/0488 |
| 2008/0052205 A1 | 2/2008 | Dolley et al. | |
| 2010/0048302 A1* | 2/2010 | Lutnick | G07F 17/3286 463/42 |
| 2012/0199645 A1* | 8/2012 | Rothschild | G06Q 20/10 235/375 |
| 2012/0299961 A1* | 11/2012 | Ramkumar | G06F 16/24575 345/632 |
| 2013/0282421 A1* | 10/2013 | Graff | G06Q 10/1093 705/7.18 |
| 2014/0152882 A1 | 6/2014 | Samek et al. | |
| 2014/0344118 A1* | 11/2014 | Parpia | G06Q 10/087 705/28 |
| 2015/0219748 A1* | 8/2015 | Hyatt | G01S 13/74 342/450 |
| 2015/0363625 A1* | 12/2015 | Wu | G06K 7/146 382/203 |
| 2017/0193434 A1* | 7/2017 | Shah | G05D 1/0212 |
| 2017/0337508 A1* | 11/2017 | Bogolea | G06K 9/00771 |
| 2018/0001481 A1* | 1/2018 | Shah | B25J 9/1697 |
| 2018/0293543 A1* | 10/2018 | Tiwari | H04W 4/023 |
| 2019/0180221 A1* | 6/2019 | Greenberger | G06Q 30/0255 |

OTHER PUBLICATIONS

Lai Yin, Hooi, Managing Out-of-Stocks and Over-Stock Occurrences in Supermarket Stores: A Case Study in Singapore, Thesis for Doctor Philosophy, School of Business Information Technology and Logistics, RMT University, Oct. 2013.

Gwen, Thomas W., A Comprehensive Guide to Retail Out-of-Stock Reduction in the Fast-Moving Consumer Goods Industry, P&G, 2008.

* cited by examiner

AUGMENTED TOUCH-SENSITIVE DISPLAY SYSTEM

CROSS-REFERENCE TO RELATED PATENT APPLICATION

This application claims priority to U.S. Provisional Application No. 62/516,766 filed on Jun. 8, 2017, the content of which is hereby incorporated by reference in its entirety.

BACKGROUND

Updating sets of physical objects and maintaining accurate data associated with the sets of physical object can be difficult, particularly where the status of the sets of physical objects are constantly changing. While some of the data can be updated and/or maintained through normal processes, errors can occur when elements are not channeled through normal processes.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain the invention. In the figures.

DETAILED DESCRIPTION

Figure 1:
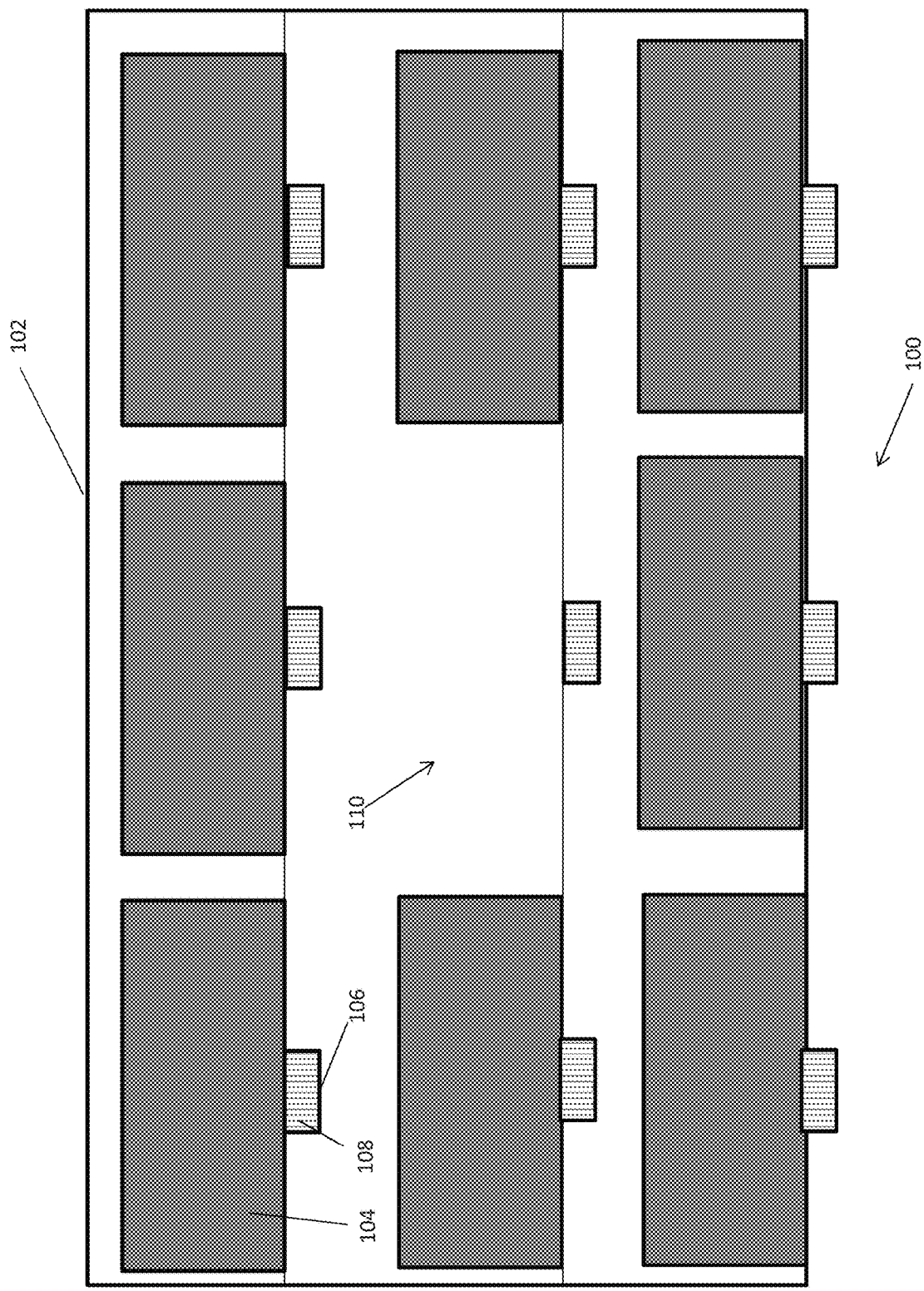
FIG. 1 is a schematic diagram of an exemplary arrangement of physical objects disposed in a facility according to an exemplary embodiment.

Described in detail herein are systems and methods for an augmented touch-sensitive display system. A portable electronic device including a touch-sensitive display and an image capturing device, can execute a generation application stored in memory via the processor. The portable electronic device can control the operation of the image capturing device, in response to executing the application to contemporaneously and continuously image an area within a field of view of the image capturing device. The portable electronic device can render on the touch-sensitive display a physical scene within the field of view of the image capturing device. The portable electronic device, can parse the physical scene rendered on the touch-sensitive display into discrete elements based on dimensions of items in the physical scene. One of the discrete elements includes a label with a string of alphanumeric character and/or a machine-readable element associated with a physical object. The portable electronic device can extract the string of alphanumeric characters from the at least one of the discrete elements. The portable electronic device can superimpose a selectable link on the at least one of the discrete elements on the touch-sensitive display. In response to a first user gesture on the touch-sensitive display, corresponding with selection of the selectable link, augmenting, via portable electronic device, the physical scene rendered on the touch-sensitive display to superimpose physical object information associated with string of alphanumeric characters corresponding to the selectable link and one or more additional dynamically generated selectable links on the physical scene rendered on the display.

The portable electronic device is configured to transmit the string of alphanumeric characters extracted from the at least one of the discrete elements to the computing system. The computing system is configured query a database to retrieve the physical object information using the string of alphanumeric characters and transmit the physical object information to the portable electronic device, wherein the physical object information includes an amount of physical objects disposed in the facility. The one or more additional dynamically generated selectable links include a first selectable link, a second selectable link, and a third selectable link. The portable electronic device is configured to increase the amount of the physical objects displayed on the touch-sensitive display, in response to receiving a selection of the first selectable link, decrease the amount of physical objects displayed on the touch-sensitive display, in response to receiving a selection of the second selectable link and transmit a numerical value corresponding to the increased or decreased amount of physical objects to the computing system, in response to receiving a selection of the third selectable link.

The computing system is programmed to commit the numerical value corresponding to the increased or decreased amount of physical objects, in the database. The computing system is configured to determine whether additional physical object are required in the facility in response to confirming the set of physical objects are absent from the area, based on the numerical value corresponding to the increased or decreased amount of physical objects, detect whether a specified mobile device executing an application is within a specified distance of the facility. In response to determining the specified mobile device is within the specified distance of the facility, the computing system can transmit a request to the specified mobile device including instructions for addressing the absence of the set of like physical objects in the facility. A printing device is coupled to the computing system. The computing system is configured to instruct the printing device to print the request.

Embodiments include a method implemented by an autonomous distributed computing system. An autonomous robot device autonomously scans an area in the facility for a set of like physical objects to confirm whether the set of like physical objects are absent from the facility. The autonomous robot device transmits a confirmation message to the computing system. The computing system determines whether additional like physical object are in a different area of the facility in response to the autonomous robot confirming the set of physical objects are absent from the area, in response to receiving the confirmation message from the autonomous robot device. The computing system detects whether a specified portable electronic executing an application is within a specified distance of the facility and transmit a request to the specified portable electronic including instructions for addressing the absence of the set of like physical objects in the area, in response to determining the specified portable electronic is within the specified distance of the facility.

FIG. 1 is a schematic diagram of an exemplary arrangement of physical objects disposed in a facility according to an exemplary embodiment. A shelving unit 102 can be disposed in a facility 100. The shelving unit 102 can support and hold physical objects 104. The physical objects 104 can include multiple sets of like physical objects 104. A label 106 can be disposed beneath each set of like physical objects 104. The label 106 can display a string of alphanumeric characters and/or a machine-readable element 108 encoded with an identifier associated with a set of like physical objects disposed above the corresponding label 106. A set of like physical objects 104 can also be absent from the shelving unit 102 creating a vacant space 110.

Figure 2:
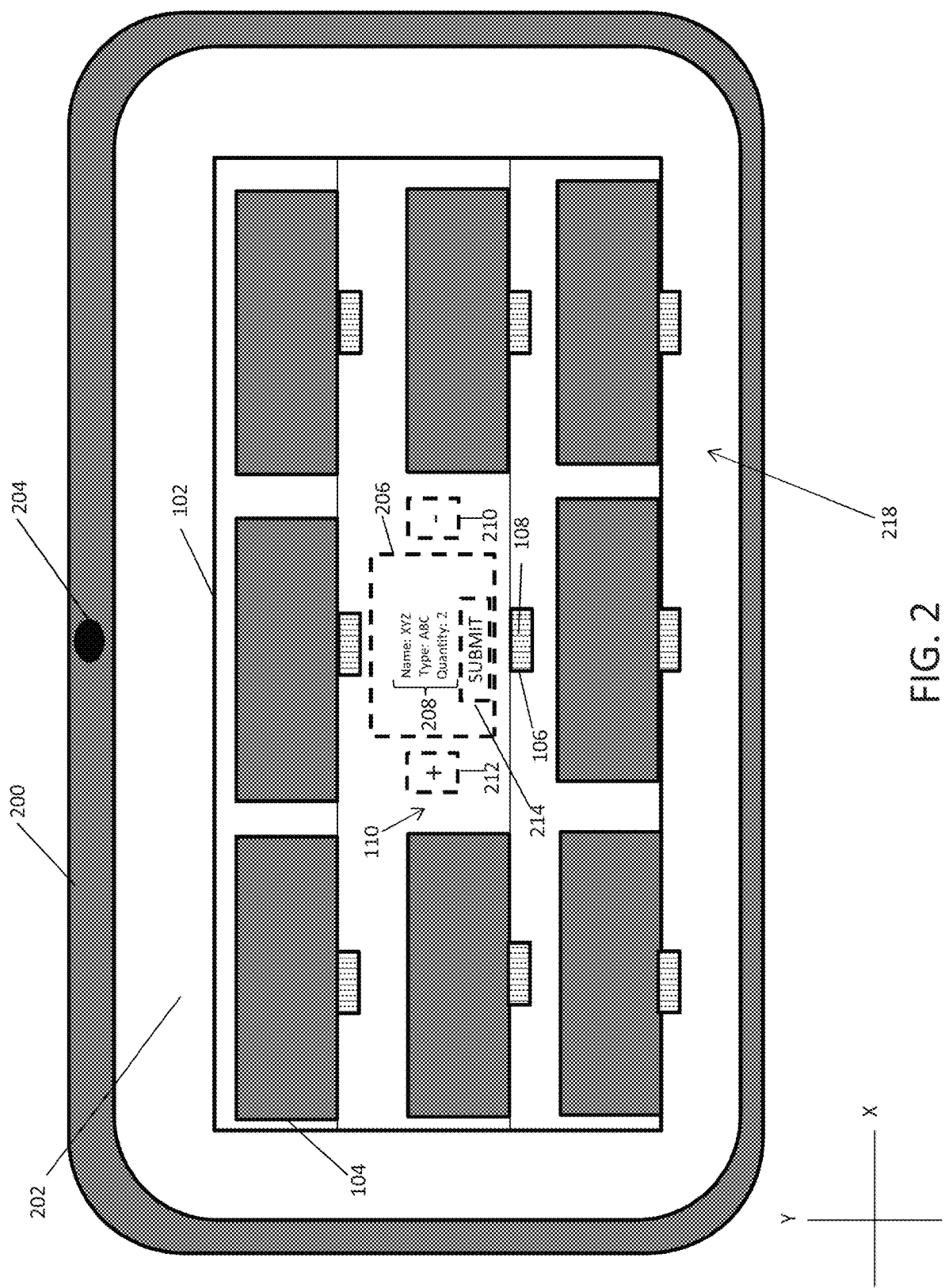
FIG. 2 is a schematic diagram of an image capturing device capturing the arrangement of physical objects disposed in a facility according to an exemplary embodiment.

FIG. 2 is a schematic diagram of an image capturing device 204 of a portable electronic device 200 capturing the arrangement of physical objects disposed in a facility according to an exemplary embodiment. The portable electronic device 200 can also include a touch-sensitive display 202. The image capturing device 204 can capture still or moving images. The image capturing device 204 can be disposed on the front or rear of the portable electronic device 200. The touch-sensitive display 202 can display a physical scene in the field of view of the image capturing device 204.

In exemplary embodiment, the portable electronic device 200 can execute a generation application. The generation application can instruct the portable electronic device 200 to control the operation of the image capturing device 204, to power on the image capturing device 204. The generation application will be discussed in further detail with respect to FIG. 5. In response to powering on, a lens and optical sensor included in the image capturing device 204 can become operational. The image capturing device 204 can be pointed at a physical scene, viewable to the lens and optical sensor, and the physical scene can displayed on the touch-sensitive display 202. The image capturing device 204 can zoom, pan, capture and store the physical scene. For example, the physical scene can be the shelving unit 102 disposed in the facility 100.

In one embodiment, in response to pointing the image capturing device 204 at a physical scene (e.g. the shelving unit 102) for more than a specified amount of time, the image capturing device 204 can detect attributes associated with the physical scene. Continuing with the example in which the physical scene includes the shelving unit 102, the image capturing device 204 can detect attributes (e.g. shapes, sizes, dimensions etc. . . . ) of a physical item in the physical space, such as the shelving unit 102, various physical objects 104 disposed on the shelving unit 102 and the corresponding labels 106. In some embodiments, the touch-sensitive display 202 can display a visual indicator each time a physical item (i.e. the shelving unit 102, physical objects 104 and/or labels 106) is detected. For example, the visual indicator can be a box superimposed around the physical item. The portable electronic device 200 can correlate the detected physical objects 104 with the labels 106 disposed beneath the physical objects 104. The portable electronic device 200 can also determine there is a vacant space 110 above a label 106.

A user operating the portable electronic device 200 can tap or touch a physical item displayed on the touch-sensitive display 202. The portable electronic device 200 can transmit the detected attributes of the physical item on which the user as tapped or touched, to a computing system. The computing system will be discussed in further detail with respect to FIG. 5. For example, a user can tap on the vacant space 110, the portable electronic device 200 can transmit, the shape, size and dimensions of the vacant space to the computing system. Furthermore, the image capturing device 204 can extract a string of characters or decode a identifier from the machine-readable element 108 displayed on the label 106 corresponding to the physical object designated to be disposed in the vacant space 110. The portable electronic device 200 can send the extracted string or decoded identifier to the computing system.

The portable electronic device 200 can receive information associated with the physical object and instructions to display the information. The portable electronic device 200 can augment the display of the physical scene on the touch-sensitive display 202, by overlaying information 208 associated with the physical object on the physical scene rendered on the touch-sensitive display. The portable electronic device 200 can overlay an outline 206 of a shape of the physical object 104. The portable electronic device 200 can display the information 208 associated with the physical object inside the outline 206 of the shape of the physical object 104 and can display a first input button 210 and a second input button 212 on either side of the outline 206 of the shape of the physical object 208. A third input button 214 can be displayed below the information 208.

The information 208 can include the name of the physical object, the type of physical object and a quantity of the physical object remaining in the facility according to a database. For example, continuing with the example of the user tapping or touching the vacant space 110 displayed on the touch-sensitive display 202, the quantity of the physical object designated to be disposed on the vacant space 110, as stored in the database can be 2. The user can determine the quantity retrieved from the database is incorrect because there are 0 physical objects present on the shelving unit 102. The user can adjust the information 208 using the first and second input buttons. The user can touch or tap the first, second or third input buttons displayed on the touch-sensitive display 202 to actuate the first, second or third input buttons. In response to actuating a first input button 210 can, the portable electronic device 200 can decrease the quantity displayed in the information 208. In response to actuating a second input button 212, the portable electronic device 200 can increase the quantity displayed in the information 208. In response to actuating a third input button 214, the portable electronic device 200 can transmit the changes to the information 208 to the computing system. It can be appreciated that information other than the quantity can also be edited using the first and second input buttons 210, 212. Continuing with the example of the user tapping or touching the vacant space 110 displayed on the touch-sensitive display 202, the user can actuate the first input button 210 two times, to adjust the quantity from 2 to 0, and actuate the third input button 214 to submit and transmit the changes to the computing system.

In some embodiments, the portable electronic device 200 will determine the coordinates along the X and Y axis of the location which the user has initially touched or tapped on the screen to select a physical item displayed on the touch-sensitive display 202. The portable electronic device 200 will over lay the information 208, the outline 206 of the shape of the physical object, and the first second and third input buttons 210-214 with respect to the determined location. The portable electronic device 200 can determine the location of the first, second and third input buttons 210-214 as displayed on the touch-sensitive display 202. The portable electronic device 200 can actuate the first, second and third input buttons 210-214 in response to determining the user has touched or tapped the touch-sensitive display on a location corresponding to the first second or third input buttons 210-214.

Figure 3:
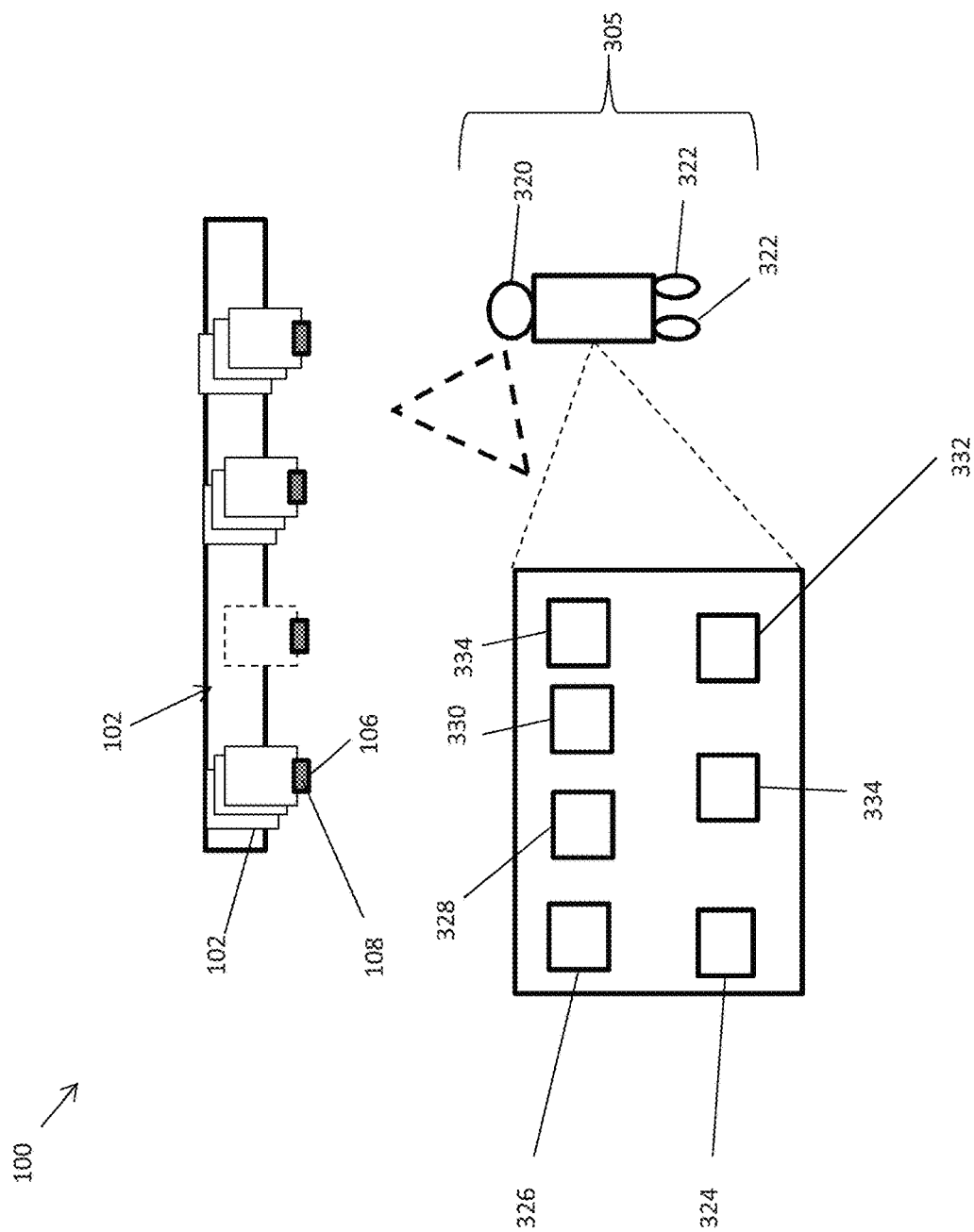
FIG. 3 is a block diagrams illustrating an autonomous robot device navigating in the facility according to exemplary embodiments of the present disclosure.

FIG. 3 is a block diagram illustrating an autonomous robot device navigating in a facility according to exemplary embodiments of the present disclosure. In exemplary embodiments, the autonomous robot device 305 can be a driverless vehicle, an unmanned aerial craft, and/or the like. As shown in FIG. 2, the autonomous robot device 305 can include an image capturing device 320, motive assemblies 322, a controller 324, an optical scanner 334, a drive motor 326, a GPS receiver 328, accelerometer 330 and a gyroscope 332, and can be configured to roam autonomously through a facility 100. The autonomous robot device 305 can be and intelligent device capable of performing tasks without human control. The controller 324 can be programmed to control an operation of the image capturing device 320, the optical scanner 334, the drive motor 326, the motive assemblies 322 (e.g., via the drive motor 326), in response to various inputs including inputs from the GPS receiver 328, the accelerometer 330, and the gyroscope 332. The drive motor 326 can control the operation of the motive assemblies 322 directly and/or through one or more drive trains (e.g., gear assemblies and/or belts). In this non-limiting example, the motive assemblies 322 are wheels affixed to the bottom end of the autonomous robot device 305. The motive assemblies 322 can be but are not limited to wheels, tracks, rotors, rotors with blades, and propellers. The motive assemblies 322 can facilitate 360 degree movement for the autonomous robot device 305. The image capturing device 320 can be a still image camera or a moving image camera.

The controller 324 of the autonomous robot device 305 can be configured to control the drive motor 326 to drive the motive assemblies 322 so that the autonomous robot device 305 can autonomously navigate through the facility 100 based on inputs from the GPS receiver 328, accelerometer 330 and gyroscope 232. The GPS receiver 228 can be an L-band radio processor capable of solving the navigation equations in order to determine a position of the autonomous robot device 305, determine a velocity and precise time (PVT) by processing the signal broadcasted by GPS satellites. The accelerometer 330 and gyroscope 332 can determine the direction, orientation, position, acceleration, velocity, tilt, pitch, yaw, and roll of the autonomous robot device 305. In exemplary embodiments, the controller can implement one or more algorithms, such as a Kalman filter, for determining a position of the autonomous robot device As noted with reference to FIG. 1, physical objects 104 can be disposed on a shelving unit 102 in a facility. A label 106 can be disposed below the physical objects 104. The label 106 can include a string of alphanumeric characters and/or a machine-readable element 108 encoded with an identifier associated with the physical object disposed above the corresponding label 106. The autonomous robot device 305 can roam in the facility 100 using the motive assemblies 322 and the controller 324 can control the image capturing device 320 to capture images of the set of physical objects 104 and the respective labels including the string and/or machine-readable elements 108. As mentioned above the autonomous robot device 305 can programmed with a map of the facility 100 and/or can generate a map of the facility 100 using simultaneous localization and mapping (SLAM).

The autonomous robot device 305 can navigate around the facility 100 based on inputs from the GPS receiver 328, the accelerometer 330, and/or the gyroscope 332. The autonomous robot device 305 can be configured to capture images after an amount of time that elapses between captures, a distance traveled within the facility 100, continuously, and/or the like. The autonomous robot device 305 can determine from the captured image that the set of like physical objects 104 is absent from the shelving unit 102. The autonomous robot device 305 can use machine vision to determine the set of like physical objects 104 is absent from the shelving unit. Machine vision can be used to provide imaging-based automatic inspection and analysis of the facility 100. The autonomous robot device 305 can extract the identifier from the machine-readable element 108 of the absent set of like physical objects 104 from the captured image using machine vision. The autonomous robot device 305 can transmit the identifier 314 to a computing system. The computing system will be discussed in greater detail with reference to FIG. 5.

Figure 4:
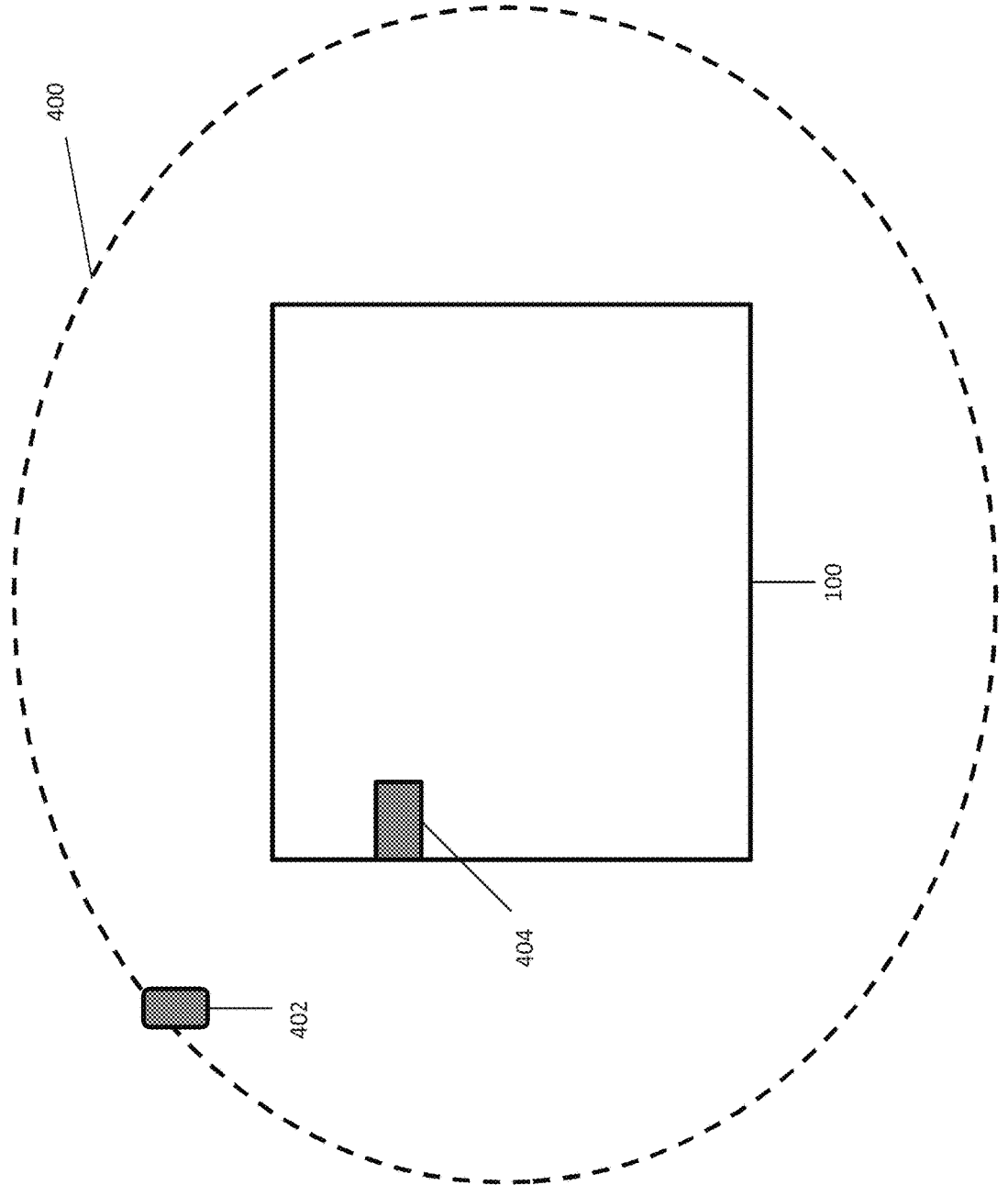
FIG. 4 illustrates an exemplary a geo-fence around the facility in accordance with an exemplary embodiment.

FIG. 4 illustrates an exemplary geo-fence around the facility in accordance with an exemplary embodiment. In one embodiment, a mobile device 402 can be detected in response to crossing a geo-fence 400. The geo-fence forms a virtual perimeter that surrounds the facility and can be within a specified distance of the facility 100. An identifier of the mobile device 402 can be transmitted to a computing system. The computing system can determine that there is a quantity of a physical object associated with mobile device 402 in the facility that is less than a specified amount. The computing system 402 can transmit an alert associated with the quantity of the physical object. In some embodiments, a printer 404 can be disposed in the facility 100. In response to determining the mobile device 402 has crossed the geo-fence 400 and determining the quantity of a physical object associated with mobile device 402 is less than a specified amount, the computing system can instruct the printer to print out a report associated with the physical object. The computing system will be discussed in further detail with respect to FIG. 5.

Figure 5:
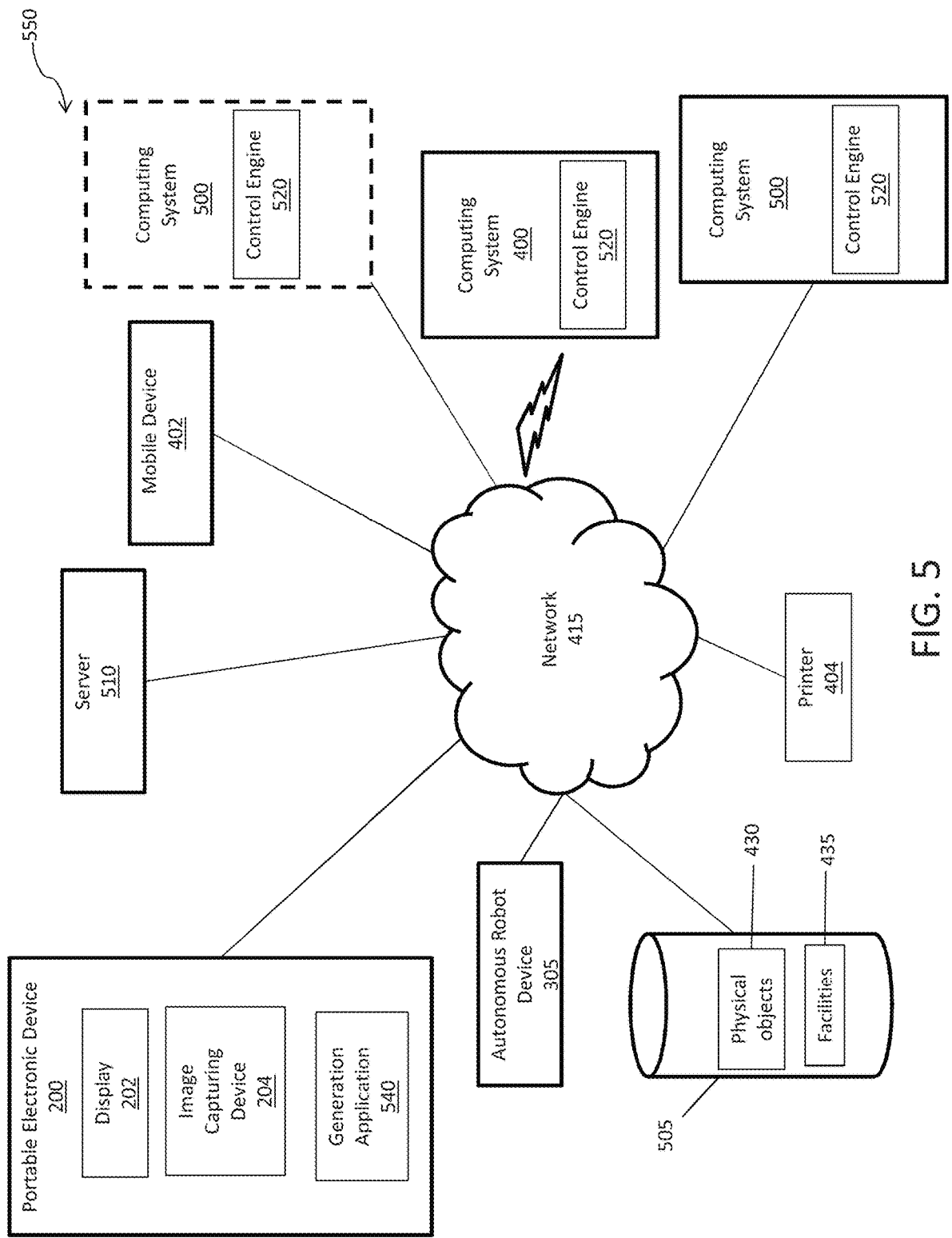
FIG. 5 illustrates a network diagram of an augmented touch-sensitive display system in accordance with an exemplary embodiment.

FIG. 5 illustrates a network diagram in which an augmented touch-sensitive display system can be implemented in accordance with an exemplary embodiment. The augmented touch-sensitive display system 550 can include one or more databases 505, one or more computing systems 500, one or more portable electronic devices 200, one or more mobile devices 402, one or more autonomous robot devices 305, and one or more printers 116 communicating over communication network 515. The portable electronic device 200 can include a touch-sensitive display 202, an image capturing device 204, and a generation application 540. The generation application 540 can be an executable application residing on the portable electronic device 200, as described herein. The computing system 500 can execute one or more instances of a control engine 520. The control engine 520 can be an executable application residing on the computing system 500 to implement the augmented touch-sensitive display system 550 as described herein.

In an example embodiment, one or more portions of the communications network 515 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 500 includes one or more computers or processors configured to communicate with the databases 505, portable electronic devices 200, mobile devices 402, autonomous robot devices 305, and the printers 116 via the network 515. The computing system 500 hosts one or more applications configured to interact with one or more components of the augmented touch-sensitive display system 550. The databases 505 may store information/data, as described herein. For example, the databases 505 can include a physical objects database 530 and a mobile device database 535. The physical objects database 530 can store information associated with physical objects. The mobile device database 535 can store information associated with qualified mobile devices. The information can include a layout of a facility, a planogram of a facility, a blueprint of a facility, the structure of a facility and/or any other information related to a facility. The databases 305 can be located at one or more geographically distributed locations from the first computing system 300. Alternatively, the databases 305 can be included within the computing system 300.

In one embodiment, a user can operate a portable electronic device 200 in a facility. The portable electronic device 200 can execute a generation application 540 in response to the user's interaction. The generation application 540 can instruct the portable electronic device 200 to control the operation of the image capturing device 204, to power on the image capturing device 204. In response to powering on, a lens and optical sensor included in the image capturing device 204 can become operational. The image capturing device 204 can be pointed at a physical scene in the facility, viewable to the lens and optical sensor, and the physical scene can displayed on the touch-sensitive display 202. The image capturing device 204 can zoom, pan, capture and store the physical scene. For example, the physical scene can be the shelving unit disposed in the facility.

In one embodiment, in response to pointing the image capturing device 204 at a physical scene (e.g. the shelving unit) for more than a specified amount of time, the image capturing device 204 can detect attributes associated with the physical scene. Continuing with the example in which the physical scene includes the shelving unit, the image capturing device 204 can detect attributes (e.g. shapes, sizes, dimensions etc. . . . ) of a physical item in the physical space, such as the shelving unit, various physical objects disposed on the shelving unit and labels corresponding to the physical objects. The image capturing device 204 can use one or more of the following algorithms to detect attributes associated with the physical items in the physical space: the blob-based algorithm and/or the shape based algorithm. The blob based algorithm identifies small details such as the size of the pixels, the color of the pixels and the quantity of the pixels, of an object as distinctive features. The distinctive features are extracted into an object model to recognize the object. The shape based algorithm can detect edges (i.e. based on a change of color in neighboring pixels) of the different shape of the physical items detect the different physical items in the physical scene. The shape based algorithm can determine the shape, dimensions and size of the physical item based on the detection of the edges.

The user operating the portable electronic device 200 can tap or touch a physical item displayed on the touch-sensitive display 202. The physical item can be a physical object disposed on the shelving unit or an area of the shelving unit in which the physical object is designated to be disposed. The portable electronic device 200 can detect the label associated with physical object. As described herein, the label can include a machine readable element and/or a string of alphanumeric text. The portable electronic device 200 can receive a user gesture, such as a tap or a touch on a location on the screen, and/or some sort of non-touch user gesture. The generation application 540 can generate a selectable link and superimpose the selectable link over the label. The portable electronic device 200 can receive another user gesture selecting the selectable link. The portable electronic device 200 can transmit the decoded identifier form the machine-readable element and/or the alphanumeric text to the computing system 500, in response to selecting the link. Alternatively, or in addition, the portable electronic device 200 can transmit the detected attributes of the physical object or space on which the user as tapped or touched, to the computing system 500. The attributes can include shape, size, and dimensions associated with the physical object.

The computing system 500 can execute the control engine 520 in response to receiving the identifier and/or alphanumeric text associated with the physical object. The control engine 520 can identify the physical object based on the identifier and/or alphanumeric text associated with the physical object. Alternatively or in addition, the control engine 520 can identify the physical object based on received attributes associated with the physical object and/or space in which the physical object is designated to be disposed. The control engine 520 can query the physical objects database 530 to retrieve information associated with the identified physical object. The information can include a quantity of physical objects in the facility. The control engine 520 can transmit the information along with instructions to display the information to the portable electronic device 200

The portable electronic device 200 can receive information associated with the physical object and instructions to display the information. The generation application 540 can generate an image associated with the information. For example, the generation application 540 can generate an image of an outline of the shape of the object. The portable electronic device 200 can augment the display of the physical scene on the touch-sensitive display 202, by overlaying the generated image and the information associated with the physical object on the display of the physical scene on the touch-sensitive display. The portable electronic device 200 can overlay an outline of a shape of the physical object, the information associated with the physical object inside the outline of the shape of the physical object, a first input button, and a second input button on either side of the outline of the shape of the physical object. A third input button can be displayed below the information.

The information can include the name of the physical object, the type of physical object and a quantity of the physical object remaining in the facility according to the physical objects database 530. The user can determine the quantity retrieved from the database, is incorrect, since there are greater or fewer number of physical objects on the shelving unit, as compared to the displayed quantity. The user can adjust the information using the first and second input buttons. The user can touch or tap the first, second or third input buttons displayed on the touch-sensitive display to actuate the first, second or third input buttons. In response to actuating the first input button can, the portable electronic device 200 can decrease the quantity displayed in the information. In response to actuating the second input button, the portable electronic device 200 can increase the quantity displayed in the information. In response to actuating the third input button the portable electronic device 200 can transmit the changes to the information to the computing system 500. The computing system 500 can receive the updated quantity information from the portable electronic device 200. The control engine 520 can update the physical objects database 530 with the updated quantity information.

In some embodiments, autonomous robot devices 305 can determine like physical objects absent from a first location in a facility. For example, an autonomous robot device 305 can roam a facility and capture images of physical objects disposed in the facility using an image capturing device. For example, the autonomous robot device 305 can be programmed with a map of the facility and/or can generate a map of the facility using simultaneous localization and mapping (SLAM), and can roam or navigate through the facility based on the map where the current location of the autonomous robot device 305 can be determined by the autonomous robot device based on an inertial navigation system, a GPS receiver, triangulation of wireless transmission in the facility, e.g., via WiFi access points. The autonomous robot device 305 can detect from the captured images, like physical objects absent from a first location in the facility at which the like physical objects are supposed to be disposed and can capture identifiers associated with the physical objects disposed at the first location, e.g., via the image capturing device and/or an optical scanner. For example, the autonomous robot device 305 can capture images of the physical objects throughout the facility and detect absent physical objects and extract the identifier for the physical object from an image using machine vision. As a non-limiting example, the autonomous robot device 305 can retrieve an image of a physical object in the facility stored in the physical object database 330. The autonomous robot device 305 can compare an image of the absent physical object with the retrieved image of the physical object at the facility and determine the physical object is absent from the facility. The types of machine vision used by the autonomous robot device 305 can be but are not limited to: Stitching/Registration, Filtering, Thresholding, Pixel counting, Segmentation, Inpainting, Edge detection, Color Analysis, Blob discovery & manipulation, Neural net processing, Pattern recognition, Barcode Data Matrix and "2D barcode" reading, Optical character recognition and Gauging/Metrology. The autonomous robot device 305 can transmit the identifier of the absent like physical objects to the computing system 500.

The control module 520 can query the physical objects database 530 using the identifier to retrieve data corresponding to the expected quantity of the like physical objects in the facility. The control engine 520 can determine that there is a need for more of the like physical objects in the facility. The control module 520 can store the data associated with the like physical objects in the physical objects database 530 indicating the need to add the like physical objects to the set of like physical objects disposed at the first location in the facility.

The control engine 520 can retrieve the perpetual inventory value associated with the like physical objects for the facility from the physical objects database 530. The perpetual inventory value can be a numerical value indicating the expected inventory of physical objects available at the facility. For example, if the perpetual inventory value associated with the like physical objects at the facility indicates a perpetual inventory of 10 like physical objects, the control engine 520 can determine that there is a perpetual inventory error of ten (10) in response to determining there are actually zero (0) like physical objects at the facility based on received data from the portable electronic device 200 and/or identifiers received from the autonomous robot device 305. The control engine 520 can correct the perpetual inventory error by changing the perpetual inventory value to zero (0) so that the perpetual inventory value indicates that the like physical objects are not present at the facility.

In some embodiments, the control engine 520 can flag the physical objects which have a quantity less than a threshold amount, in the physical objects database 530 based on the perpetual inventory value. The control engine 520 can detect a mobile device 402 is within a specified distance of the facility. The control engine 520 can capture the identifier of the mobile device 402. The control engine 520 can query the mobile device database 535 using the captured identifier. The control engine 520 can determine the mobile device 402 is associated with a physical object which requires replenishment in the facility, based on the query. The control engine 520 can transmit an alert to the mobile device. In some embodiments, a printer 404 can be disposed in the facility. The control engine 520 can instruct the printer to print a report of the physical objects which require replenishment.

As a non-limiting example, the augmented touch-sensitive display system 550 can be implemented in a retail store to correct the perpetual inventory values of products disposed at the retail store. The facility can be embodied as a retail store and the physical objects can be embodied as products for sale at the retail store. The computing system 500 can receive corrected inventory values based on information associated with the products for sale in the facility received from the portable electronic devices 200 and/or automated robotic devices 305. The control engine 520 can correct the perpetual inventory values of the products for sale in the physical objects database 530 based on the received information.

The control engine 520 can flag the products which have a quantity less than a threshold amount, in the physical objects database 530 based on the perpetual inventory value. The control engine 520 can detect a mobile device 402 belonging to a vendor is within a specified distance of the facility. The control engine 520 can capture the identifier of the mobile device 402. The control engine 520 can query the mobile device database 535 using the captured identifier. The control engine 520 can determine the mobile device 402 belongs to a vender who is associated with one or more products which require replenishment in the retail store, based on the query. The control engine 520 can transmit an alert to the mobile device. The control engine 520 can instruct the printer to print a report of the products which require replenishment which are associated with the vendor approaching the retail store. The printed report can be ready for the vendor upon his/her arrival.

Figure 6:
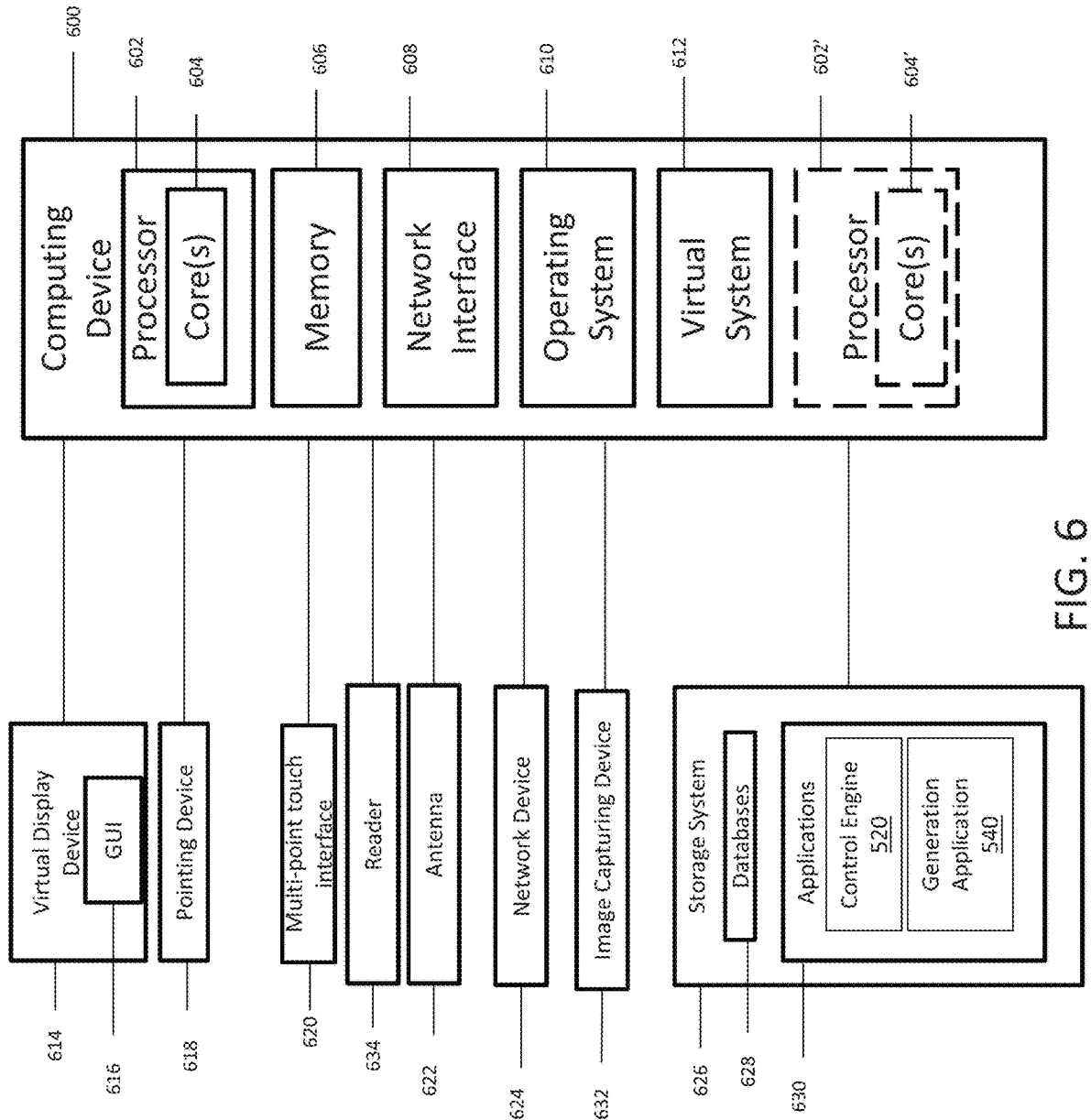
FIG. 6 illustrates a block diagram an exemplary computing device in accordance with an exemplary embodiment.

FIG. 6 is a block diagram of an exemplary computing device suitable for implementing embodiments of the augmented touch-sensitive display system. The computing device may be, but is not limited to, a smartphone, laptop, tablet, desktop computer, server or network appliance. The computing device 600 can be embodied as the computing system, portable electronic device, mobile device, and/or autonomous robot device. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 606 included in the computing device 600 may store computer-readable and computer-executable instructions or software (e.g., applications 630 such as the control engine 520 and the generation application 540) for implementing exemplary operations of the computing device 600. The computing device 600 also includes configurable and/or programmable processor 602 and associated core(s) 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for implementing exemplary embodiments of the present disclosure. Processor 602 and processor(s) 602' may each be a single core processor or multiple core (604 and 604') processor. Either or both of processor 602 and processor(s) 602' may be configured to execute one or more of the instructions described in connection with computing device 600.

Virtualization may be employed in the computing device 600 so that infrastructure and resources in the computing device 600 may be shared dynamically. A virtual machine 612 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof. The computing device 600 can receive data from input/output devices such as, a reader 634 and an image capturing device 632.

A user may interact with the computing device 600 through a visual display device 614, such as a computer monitor, which may display one or more graphical user interfaces 616, multi touch interface 620 and a pointing device 618.

The computing device 600 may also include one or more storage devices 626, such as a hard-drive, CD-ROM, or other computer readable media, for storing data and computer-readable instructions and/or software that implement exemplary embodiments of the present disclosure (e.g., applications such as the control engine 520 and the generation application 540). For example, exemplary storage device 626 can include one or more databases 628 for storing information regarding the physical objects and mobile devices. The databases 628 may be updated manually or automatically at any suitable time to add, delete, and/or update one or more data items in the databases. The databases 628 can include information associated with physical objects disposed in the facility, information associated with the facilities and information associated with user accounts.

The computing device 600 can include a network interface 608 configured to interface via one or more network devices 624 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 622 to facilitate wireless communication (e.g., via the network interface) between the computing device 600 and a network and/or between the computing device 600 and other computing devices. The network interface 608 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

The computing device 600 may run any operating system 610, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 600 and performing the operations described herein. In exemplary embodiments, the operating system 610 may be run in native mode or emulated mode. In an exemplary embodiment, the operating system 610 may be run on one or more cloud machine instances.

Figure 7:
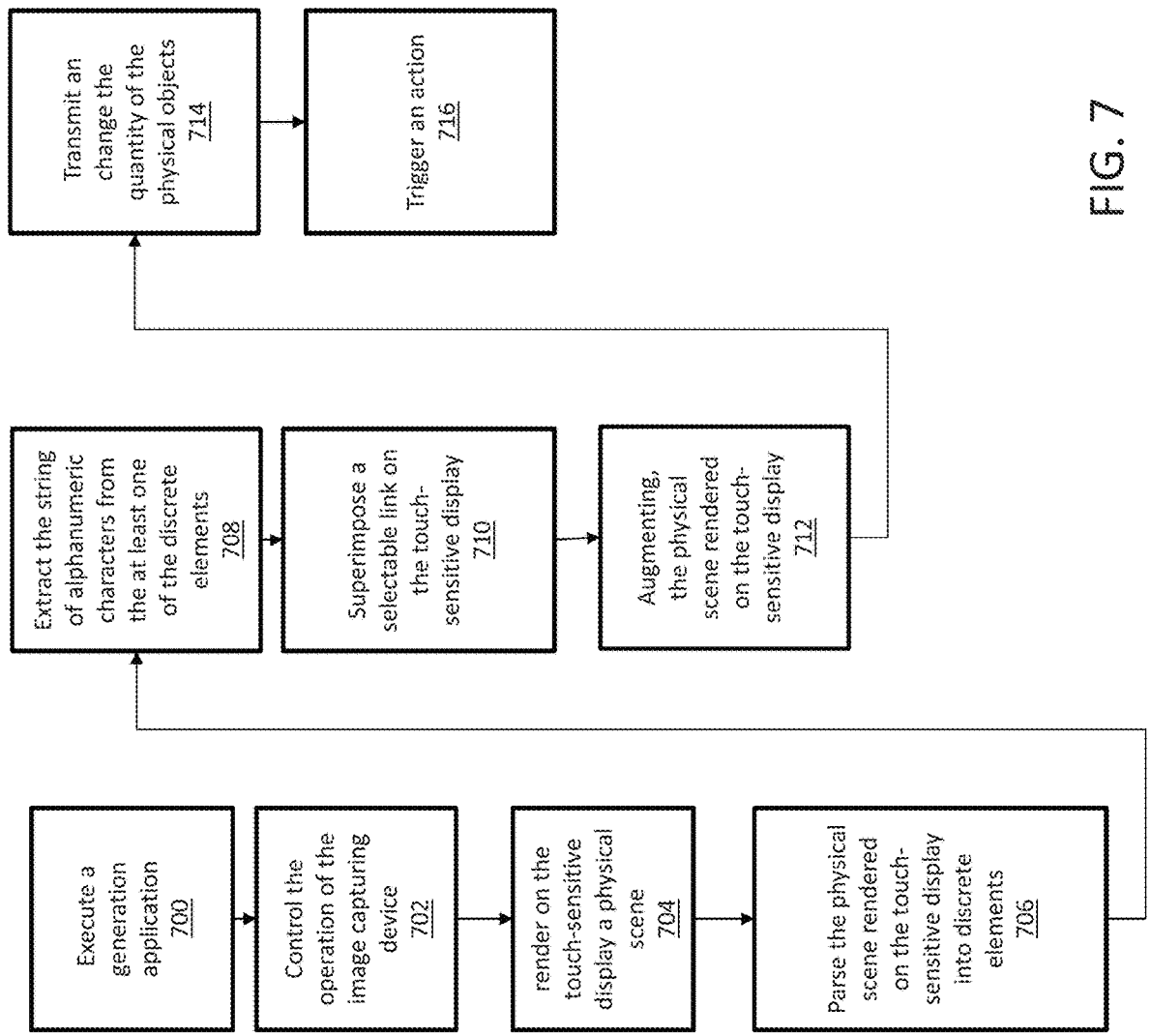
FIG. 7 is a flowchart illustrating a process implemented by an augmented touch-sensitive display system according to an exemplary embodiment.

FIG. 7 is a flowchart illustrating a process implemented by an augmented touch-sensitive display system according to an exemplary embodiment. In operation 700, a portable electronic device (portable electronic device 200 as shown in FIGS. 2 and 5) including a touch-sensitive display (touch-sensitive display 202 as shown in FIGS. 2 and 5) and an image capturing device (image capturing device 204 as shown in FIGS. 2 and 5), can execute a generation application (e.g. generation application 540 as shown in FIG. 5) stored in memory via the processor. In operation 702, the portable electronic device can control the operation of the image capturing device, in response to executing the application to contemporaneously and continuously image an area within a field of view of the image capturing device.

In operation 704, the portable electronic device can render on the touch-sensitive display a physical scene (e.g. physical scene 218 as shown in FIG. 2) within the field of view of the image capturing device. In operation 706, the portable electronic device, can parse the physical scene rendered on the touch-sensitive display into discrete elements based on dimensions of items in the physical scene. One of the discrete elements including at least a label (e.g. label 106 as shown in FIGS. 1-3) including a string of alphanumeric character associated with a physical object (e.g. physical objects 104 as shown in FIGS. 1-3). In operation 708, the portable electronic device can extract the string of alphanumeric characters from the at least one of the discrete elements. In operation 710, the portable electronic device can superimpose a selectable link (e.g. first, second and third input buttons 210-214 as shown in FIG. 2) on or near the at least one of the discrete elements on the touch-sensitive display. In operation 712, in response to a first user gesture on the touch-sensitive display, corresponding with selection of the selectable link, augmenting, via portable electronic device, the physical scene rendered on the touch-sensitive display to superimpose physical object information associated with the string of alphanumeric characters corresponding to the selectable link and one or more additional dynamically generated selectable links on the physical scene rendered on the display. The physical object information can include a quantity of physical objects disposed in the facility. In operation 714, in response to receiving additional gestures corresponding to a selection of selectable links, the portable device can transmit a change to the quantity of the physical objects displayed on the display and transmit the changed quantity to a computing system (e.g. computing system 500 as shown in FIG. 5). In operation 716, the computing system can trigger an action based on the updated quantity. The action can include updating the database (e.g. physical objects database 530 as shown in FIG. 5) and/or can include transmitting an alert to a mobile device (e.g. mobile device 402 as shown in FIGS. 4-5) of a third party associated with the physical object in response to the mobile device being within a specified distance of the facility.

Figure 8:
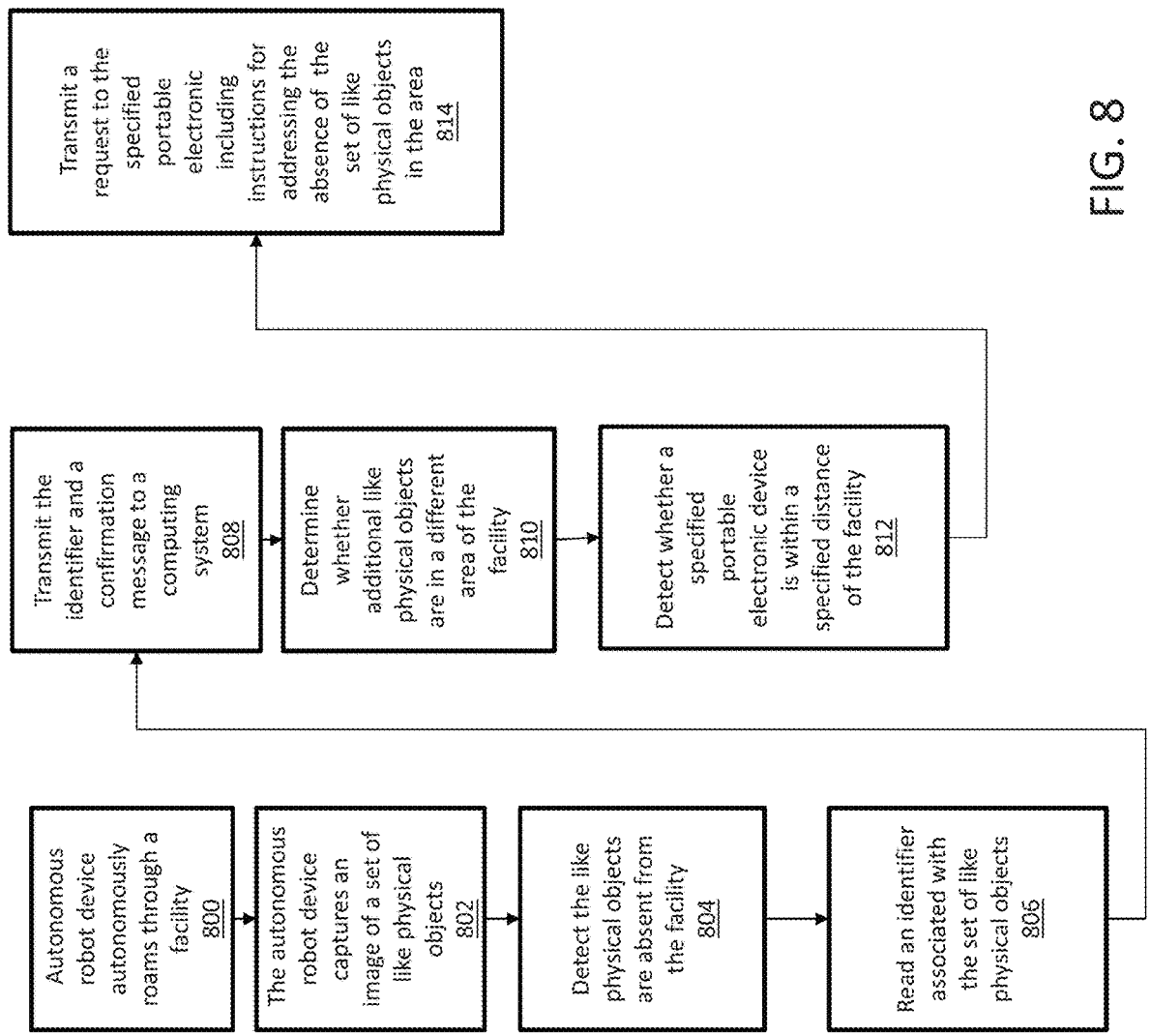
FIG. 8 is a flowchart illustrating an exemplary process in an autonomous robot system in accordance with an exemplary embodiment of the present disclosure.

FIG. 8 is a flowchart illustrating an exemplary process in an autonomous robot system in accordance with exemplary embodiments of the present disclosure. In operation 800, an autonomous robot device (e.g., the autonomous robot 305 as shown in FIGS. 3 and 5) autonomously roams through a facility (e.g., the facility 100 as shown in FIG. 1-4). In operation 802 the autonomous robot device captures an image of a set of like physical objects 104 (as shown in FIGS. 1-3) are supposed to be disposed. The autonomous robot device also captures images of the labels (e.g., the labels 106 as shown in FIGS. 1-3) associated with the like physical objects. In operation 804, the autonomous robot device can detect that like physical objects are absent from the facility based on the captured image(s). In operation 806, the autonomous robot device can read an identifier associated with the set of like physical objects. In operation 808, the autonomous robot device can transmit the identifier and a confirmation message to a computing system (e.g., a computing system 500 as shown in FIG. 5). In operation 810, the computing system can determine whether additional like physical objects are in a different area of the facility in response to the at least one autonomous robot confirming the set of physical objects are absent from the area, in response to receiving the confirmation message from the at least one autonomous robot device. In operation 812, the computing system can detect whether a specified portable electronic device (e.g. portable electronic device 200 as shown in FIG. 2) executing an application is within a specified distance of the facility. In operation 814, the computing system can transmit a request to the specified portable electronic including instructions for addressing the absence of the set of like physical objects in the area, in response to determining the specified portable electronic is within the specified distance of the facility.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

One or more of the exemplary embodiments, include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI is a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An augmented touch-sensitive display system comprising:
 a portable electronic device including a touch-sensitive display, an image capturing device, and a processor and memory, the portable electronic device configured to:
 execute an application stored in memory via the processor;
 control the operation of the image capturing device, in response to executing the application to contemporaneously and continuously image an area within a field of view of the image capturing device;
 render on the touch-sensitive display a physical scene within the field of view of the image capturing device;
 parse the physical scene rendered on the touch-sensitive display into discrete elements based on dimensions of items in the physical scene, at least one of the discrete elements including at least a label including a string of alphanumeric characters associated with a physical object;
 extract the string of alphanumeric characters from the at least one of the discrete elements;
 superimpose a selectable link on the at least one of the discrete elements on the touch-sensitive display;
 in response to a first user gesture on the touch-sensitive display corresponding with selection of the selectable link, augment the physical scene rendered on the touch-sensitive display to superimpose physical object information associated with string of alphanumeric characters corresponding to the selectable link and one or more additional dynamically generated selectable links on the physical scene rendered on the display, the one or more additional dynamically generated selectable links include a first selectable link, a second selectable link, and a third selectable link;

increase or decrease, via the portable electronic device, an amount of the physical objects displayed on the touch-sensitive display, the amount of the physical objects being increased in response to receiving a selection of the first selectable link, the amount of physical objects being decreased in response to receiving a selection of the second selectable link; and transmit a numerical value corresponding to the increased or decreased amount of physical objects to the computing system, in response to receiving a selection of the third selectable link.

2. The system of claim 1, further comprising a computing system including a database and coupled to the portable electronic device.

3. The system of claim 2, wherein the computing system is configured to query the database to retrieve the physical object information using the string of alphanumeric characters and transmit the physical object information to the portable electronic device, wherein the physical object information includes an amount of physical objects disposed in the facility.

4. The system of claim 1, wherein the computing system is programmed to commit the numerical value corresponding to the increased or decreased amount of physical objects, in the database.

5. The system of claim 4, wherein the computing system is configured to:
   determine whether additional physical object are required in the facility in response to confirming the set of physical objects are absent from the area, based on the numerical value corresponding to the increased or decreased amount of physical objects;
   detect whether a specified mobile device executing an application is within a specified distance of the facility; and
   in response to determining the specified mobile device is within the specified distance of the facility, transmit a request to the specified mobile device including instructions for addressing the absence of the set of like physical objects in the facility.

6. The system of claim 5, further comprising a printing device coupled to the computing system.

7. The system of claim 6, wherein computing system is configured to instruct the printing device to print the request.

8. The system of claim 5, wherein the portable electronic device is configured to display on the touch-sensitive display, an outline around the area in which the set of physical objects are absent.

9. The system of claim 1, wherein the computing system is configured to:
   detect whether a specified portable electronic device executing an application is within a geo-fence encompassing the facility based on an identifier of the specified portable electronic device;
   determine that the specified portable electronic device is associated with a vendor;
   query a mobile device database using the identifier of the specified portable electronic device;
   determine that the specified portable electronic device associated with the vendor provides for replenishment of the set of like physical objects based on the query; and
   transmit a request to the specified portable electronic in response to determining the specified portable electronic is within the geo-fence and that replenishment of the set of like physical objects is desired.

10. A method for augmenting a touch-sensitive display system comprising:
    executing, via a portable electronic device including a touch-sensitive display, an image capturing device, and a processor and memory, an application stored in memory via the processor;
    controlling, via the portable electronic device, the operation of the image capturing device, in response to executing the application to contemporaneously and continuously image an area within a field of view of the image capturing device;
    rendering, via the portable electronic device, on the touch-sensitive display a physical scene within the field of view of the image capturing device;
    parsing, via the portable electronic device, the physical scene rendered on the touch-sensitive display into discrete elements based on dimensions of items in the physical scene, at least one of the discrete elements including at least a label including a string of alphanumeric characters associated with a physical object;
    extracting, via the portable electronic device, the string of alphanumeric characters from the at least one of the discrete elements;
    superimposing, via the portable electronic device, a selectable link on the at least one of the discrete elements on the touch-sensitive display;
    in response to a first user gesture on the touch-sensitive display corresponding with selection of the selectable link, augmenting, via portable electronic device, the physical scene rendered on the touch-sensitive display to superimpose physical object information associated with string of alphanumeric characters corresponding to the selectable link and one or more additional dynamically generated selectable links on the physical scene rendered on the display, the one or more additional dynamically generated selectable links include a first selectable link, a second selectable link, and a third selectable link;
    increasing or decreasing, via the portable electronic device, an amount of the physical objects displayed on the touch-sensitive display, the amount of the physical objects being increased in response to receiving a selection of the first selectable link, the amount of physical objects being decreased in response to receiving a selection of the second selectable link; and
    transmitting, via the portable electronic device, a numerical value corresponding to the increased or decreased amount of physical objects to the computing system, in response to receiving a selection of the third selectable link.

11. The method of claim 10, wherein the portable electronic device is configured to transmit the string of alphanumeric characters extracted from the at least one of the discrete elements to a computing system.

12. The method of claim 11, further comprising querying, via the computing system including a database coupled to the portable electronic device, the database to retrieve the physical object information using the string of alphanumeric characters and transmit the physical object information to the portable electronic device, wherein the physical object information includes an amount of physical objects disposed in the facility.

13. The method of claim 10, further comprising committing, via the computing system, the numerical value corresponding to the increased or decreased amount of physical objects, in the database.

14. The method of claim 13, further comprising:
determining, via the computing system, whether additional physical object are required in the facility in response to confirming the set of physical objects are absent from the area, based on the numerical value corresponding to the increased or decreased amount of physical objects;
detecting, via the computing system, whether a specified mobile device executing an application is within a specified distance of the facility; and
in response to determining the specified mobile device is within the specified distance of the facility, transmitting, via the computing system, a request to the specified mobile device including instructions for addressing the absence of the set of like physical objects in the facility.

15. The method of claim 14, wherein a printing device is coupled to the computing system.

16. The method of claim 15, further comprising requesting, via the computing system, the printing device to print the request.

17. The method of claim 10, further comprising:
detecting, via the computing system, whether a specified portable electronic device executing an application is within a geo-fence encompassing the facility based on an identifier of the specified portable electronic device;
determining, via the computing system, that the specified portable electronic device is associated with a vendor;
querying, via the computing system, a mobile device database using the identifier of the specified portable electronic device;
determining, via the computing system, that the specified portable electronic device associated with the vendor provides for replenishment of the set of like physical objects based on the querying; and
transmitting, via the computing system, a request to the specified portable electronic in response to determining the specified portable electronic is within the geo-fence and that replenishment of the set of like physical objects is desired.

18. A method implemented by an autonomous distributed computing system, the method comprising:
autonomously scanning, via at least one autonomous robot device in communication with a computing system, an area in the facility for a set of like physical objects to confirm whether the set of like physical objects are absent from the facility;
transmitting, via the at least one autonomous robot device, a confirmation message to the computing system;
determining, via the computing system, whether additional like physical objects are in a different area of the facility in response to the at least one autonomous robot confirming the set of physical objects are absent from the area based on the confirmation message from the at least one autonomous robot device;
establishing a geo-fence encompassing the facility;
detecting, via the computing system, whether a specified portable electronic device executing an application is within the geo-fence based on an identifier of the specified portable electronic device;
determining that the specified portable electronic device is associated with a vendor;
querying, by the computing system, a mobile device database using the identifier of the specified portable electronic device;
determining, by the computing system, that the specified portable electronic device associated with the vendor provides for replenishment of the like physical objects; and
transmitting, via the computing system, a request to the specified portable electronic including instructions for the vendor to replenish the set of like physical objects in the area, in response to determining the specified portable electronic is within the geo-fence and that the specified portable electronic device is associated with the vendor that provides for replenishment of the like physical objects.

19. The method of claim 18, further comprising:
controlling a printer within the facility to print a report of the like physical objects to be replenished by the vendor in response to determining the specified portable electronic device is within the geo-fence.

* * * * *